(12) United States Patent
Kim

(10) Patent No.: US 12,131,571 B2
(45) Date of Patent: Oct. 29, 2024

(54) FINGERPRINT SENSOR PACKAGE AND SMART CARD HAVING THE SAME

(71) Applicant: SAMSUNG ELECTRONICS CO., LTD., Suwon-si (KR)

(72) Inventor: Woojae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 18/134,360

(22) Filed: Apr. 13, 2023

(65) Prior Publication Data

US 2024/0054806 A1 Feb. 15, 2024

(30) Foreign Application Priority Data

Aug. 10, 2022 (KR) .................. 10-2022-0099697

(51) Int. Cl.
*G06V 40/13* (2022.01)
*G06F 3/041* (2006.01)
*G06F 3/044* (2006.01)
*G06K 19/07* (2006.01)

(52) U.S. Cl.
CPC ...... *G06V 40/1306* (2022.01); *G06F 3/04164* (2019.05); *G06F 3/0445* (2019.05); *G06F 3/0446* (2019.05); *G06K 19/0718* (2013.01); *G06V 40/1329* (2022.01); *G06F 2203/04103* (2013.01)

(58) Field of Classification Search
CPC ............ G06V 40/1306; G06V 40/1329; G06F 3/0445; G06F 3/0446; G06F 3/04164; G06F 2203/04103; G06K 19/0718
See application file for complete search history.

(56) References Cited

U.S. PATENT DOCUMENTS

| | | |
|---|---|---|
| 10,229,306 B2 | 3/2019 | Kim et al. |
| 10,997,389 B2 | 5/2021 | Iwamoto et al. |
| 11,003,884 B2 | 5/2021 | Buchan et al. |
| 11,237,680 B2 | 2/2022 | Kim et al. |

(Continued)

FOREIGN PATENT DOCUMENTS

| | | | | |
|---|---|---|---|---|
| EP | 4123601 A1 * | 1/2023 | ........... | G06F 1/1652 |
| KR | 10-2015-0059341 A | 6/2015 | | |

(Continued)

*Primary Examiner* — Lixi C Simpson
(74) *Attorney, Agent, or Firm* — Sughrue Mion, PLLC

(57) ABSTRACT

A fingerprint sensor package includes a first substrate including a core insulating layer including first and second surfaces opposing each other and having a through-hole penetrating through the first surface and the second surface, a first bonding pad along a circumference of the through-hole on the first or second surface, and an external connection pad on an edge of the second surface, a second substrate having a third surface including a sensing region and a peripheral region surrounding the sensing region, and a fourth surface opposing the third surface, the second substrate including a second bonding pad along an edge of the third or fourth surface and bonded to the first bonding pad, and covering the through-hole, a controller chip on the fourth surface, and a molded layer on the second surface of the core insulating layer, covering the controller chip, and spaced apart from the external connection pad.

20 Claims, 16 Drawing Sheets

(56) References Cited

U.S. PATENT DOCUMENTS

2021/0049439 A1* 2/2021 Finn ................. G06K 19/07354
2021/0150175 A1* 5/2021 Lundberg ........... G06V 40/1306
2023/0325624 A1* 10/2023 Yang ................. G06K 19/0717
　　　　　　　　　　　　　　　　　　　　　　　235/492

FOREIGN PATENT DOCUMENTS

| KR | 10-1783711 B1 | 10/2017 |
| KR | 10-2019-0101256 A | 8/2019 |
| KR | 10-2021-0046249 A | 4/2021 |
| KR | 10-2021-0068726 A | 6/2021 |

\* cited by examiner

FINGERPRINT SENSOR PACKAGE AND SMART CARD HAVING THE SAME

CROSS-REFERENCE TO RELATED APPLICATION(S)

This application is based on and claims priority under 35 USC 119(a) to Korean Patent Application No. 10-2022-0099697 filed on Aug. 10, 2022 in the Korean Intellectual Property Office, the disclosure of which is incorporated by reference herein in its entirety.

BACKGROUND

The disclosure relates to a fingerprint sensor package and a smart card including the same.

Fingerprint recognition technology is used to prevent various security incidents by recognizing a user's fingerprint to allow for registration and authentication procedures. In detail, fingerprint recognition technology is applied to network defense of individuals and organizations, protection of various contents and data, and to secure access to financial information. The fingerprint sensor acquires a user's fingerprint information using an optical method, a capacitive method, an ultrasonic method, a thermal sensing method, or the like. The recent trend in the fingerprint sensor industry is to provide high reliability while continuously making products smaller and thinner. Accordingly, the fingerprint sensor package is required to be robust enough to not be damaged even in repeated use while improving the reliability and sensitivity of acquiring fingerprint information and reducing the overall size and height.

SUMMARY

Example embodiments provide a fingerprint sensor package having improved reliability that is not damaged even after repeated use, and a smart card including the same.

In accordance with an aspect of the disclosure, a fingerprint sensor package includes a first substrate including a core insulating layer having a first surface and a second surface opposing each other, the first substrate having a through-hole penetrating through the first surface and the second surface, a first bonding pad along a circumference of the through-hole on the first surface, and an external connection pad on an edge of the second surface; a second substrate including a third surface and a fourth surface opposing each other, a plurality of first sensing patterns spaced apart from each other in a first direction and extending in a second direction intersecting the first direction, a plurality of second sensing patterns spaced apart from each other in the second direction and extending in the first direction, on the third surface, and a second bonding pad on an edge of the fourth surface and bonded to the first bonding pad, the second substrate having an overlapping region covering the through-hole and overlapping the edge of the second surface; a controller chip on the fourth surface of the second substrate and accommodated in the through-hole of the first substrate; and a molded layer filling the through-hole on the second surface of the core insulating layer, covering the controller chip, and spaced apart from the external connection pad.

In accordance with an aspect of the disclosure, a fingerprint sensor package includes a first substrate including a core insulating layer having a first surface and a second surface opposing each other, the first substrate having a through-hole penetrating through the first surface and the second surface, a first bonding pad along a circumference of the through-hole on one of the first surface and the second surface, and an external connection pad on an edge of the second surface; a second substrate having a third surface in which a sensing region and a peripheral region surrounding the sensing region are partitioned, and a fourth surface opposing the third surface, the second substrate including a second bonding pad along an edge of one of the third surface and the fourth surface and bonded to the first bonding pad, the second substrate covering the through-hole; a controller chip on the fourth surface; and a molded layer on the second surface of the core insulating layer, covering the controller chip, and spaced apart from the external connection pad.

In accordance with an aspect of the disclosure, a smart card includes a card body including a groove region and a connection pad; a security chip in the card body; and a fingerprint sensor package configured to sense a user's fingerprint and transmit a signal comprising a sensing result to the security chip, wherein the fingerprint sensor package includes a first substrate including a core insulating layer having a first surface and a second surface opposing each other, the first substrate having a through-hole penetrating through the first surface and the second surface, a first bonding pad along a circumference of the through-hole on one of the first surface and the second surface, and an external connection pad on an edge of the second surface; a second substrate having a third surface in which a sensing region and a peripheral region surrounding the sensing region are partitioned and a fourth surface opposing the third surface, the second substrate including a second bonding pad along an edge of one of the third surface and the fourth surface and bonded to the first bonding pad, the second substrate covering the through-hole; a controller chip on the fourth surface; and a molded layer on the second surface of the core insulating layer, covering the controller chip, and spaced apart from the external connection pad, and wherein the external connection pad of the first substrate is bonded to the connection pad of the card body.

BRIEF DESCRIPTION OF DRAWINGS

The above and other aspects, features, and advantages of the disclosure will be more clearly understood from the following detailed description, taken in conjunction with the accompanying drawings, in which.

DETAILED DESCRIPTION

Hereinafter, example embodiments will be described with reference to the accompanying drawings.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

Figure 1:
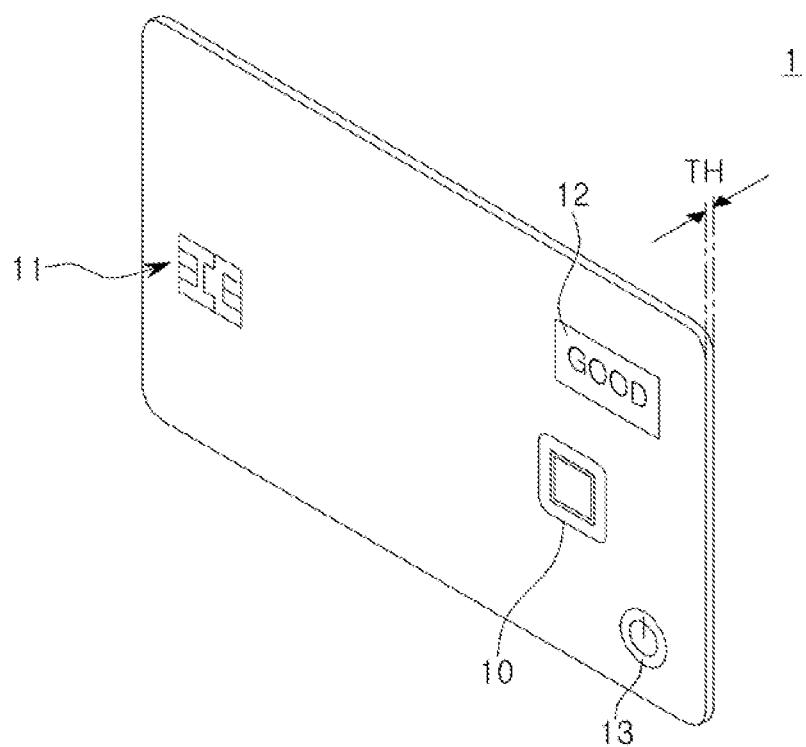
FIG. 1 is a schematic perspective view illustrating a smart card according to an example embodiment.

FIG. 1 is a schematic perspective view illustrating a smart card 1 according to an example embodiment.

Referring to FIG. 1, a smart card 1 may include a fingerprint sensor package 10, a security chip 11, a display unit 12, and a power button 13.

The smart card 1 may further include information displayed on a conventional credit card or check card, such as a card number identification unit, an expiration date identification unit, and a user name. According to an example embodiment, the smart card 1 may further include an RF chip.

The fingerprint sensor package 10 may recognize a touched fingerprint when a user brings his or her finger into contact with the fingerprint sensor. The fingerprint sensor package 10 may compare the recognized fingerprint to a registered fingerprint to determine whether the recognized fingerprint matches the registered fingerprint. The fingerprint sensor package 10 may operate after the smart card 1 is switched to an on state.

The security chip 11 may store encrypted financial information. When the recognized fingerprint and the registered fingerprint match, the security chip 11 may grant payment authorization to the user of the smart card 1. For example, the smart card 1 may prevent financial accidents due to theft or loss by allowing the security chip 11 to grant payment rights to the user based on the recognition result of the fingerprint sensor package 10.

The display unit 12 may display whether the recognized fingerprint matches the registered fingerprint, whether on/off, and the like. The display unit 12 may display letters, numbers, special symbols, and the like, and may further include a light emitting unit in some cases. However, the display unit 12 may be omitted depending on the type of the smart card 1.

The power button 13 may turn on/off the smart card 1. The smart card 1 in the off state may be switched to the on state by the operation of the power button 13, and the smart card 1 in the on state may be switched to the off state by manipulating the power button 13. Also, when a set time elapses after the smart card 1 is switched to the on state, the smart card 1 may be automatically switched to the off state.

However, depending on the type of the smart card 1, the power button 13 may be omitted.

In some embodiments, the thickness of the smart card 1 may range from about 0.5 mm to about 1 mm. In addition, the thickness of the smart card 1 may be about 0.84 mm or less according to the international standard. For example, the thickness of the smart card 1 may be about 0.76 mm or less.

Since the smart card 1 of one embodiment includes the fingerprint sensor package 10 and has the same thickness as a conventional credit card or check card, a high level of security may be provided to the user, while maintaining the manner in which a conventional credit or debit card is used. Also, the cross-sectional view of the smart card 1 of this embodiment may be substantially the same as or similar to that schematically illustrated in FIG. 5G.

FIGS. 2A to 2E are diagrams illustrating a fingerprint sensor package 10 according to example embodiments.

Figure 2A:
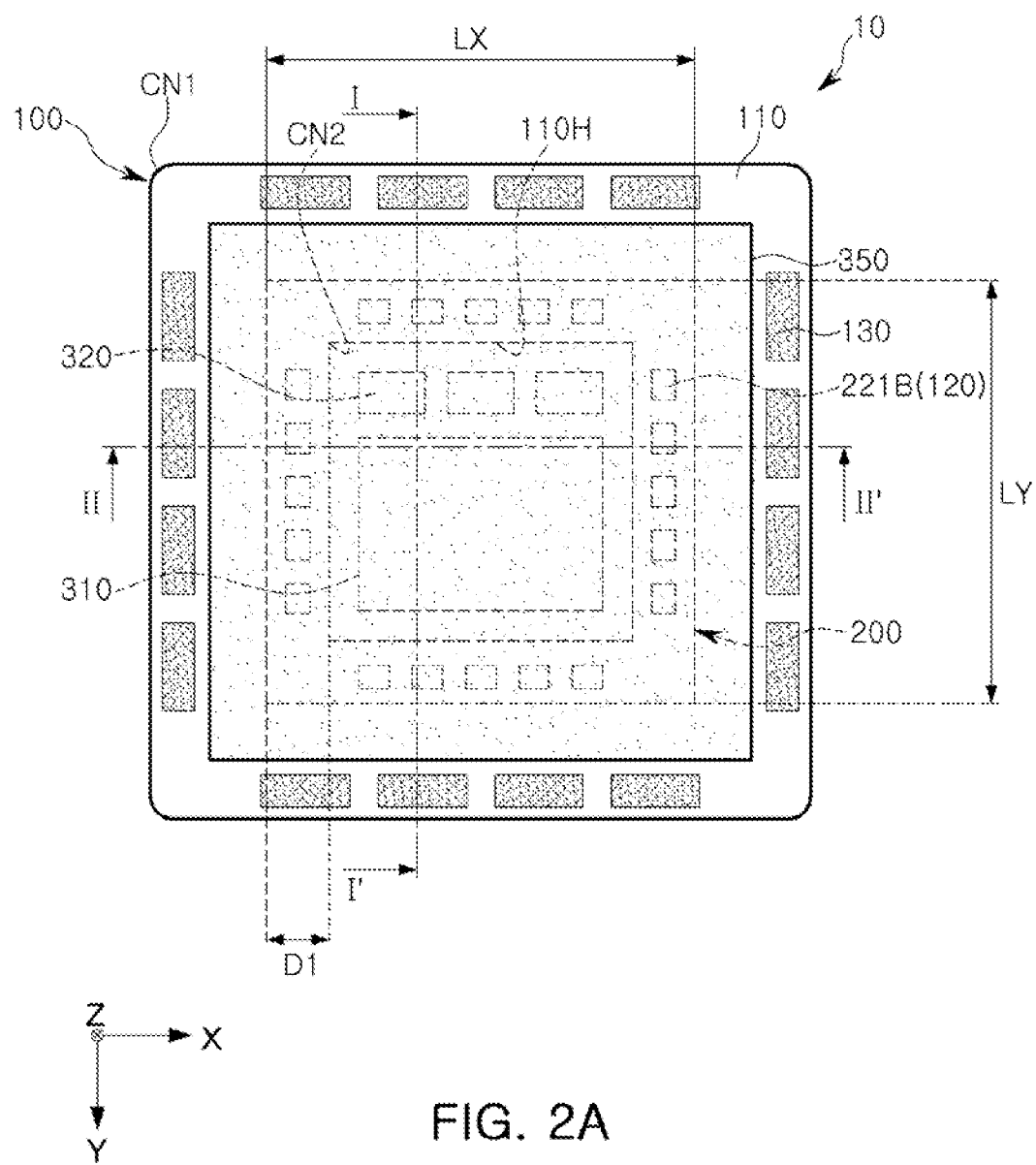
FIGS. 2A to 2E are diagrams illustrating a fingerprint sensor package according to an example embodiment.
Figure 2B:
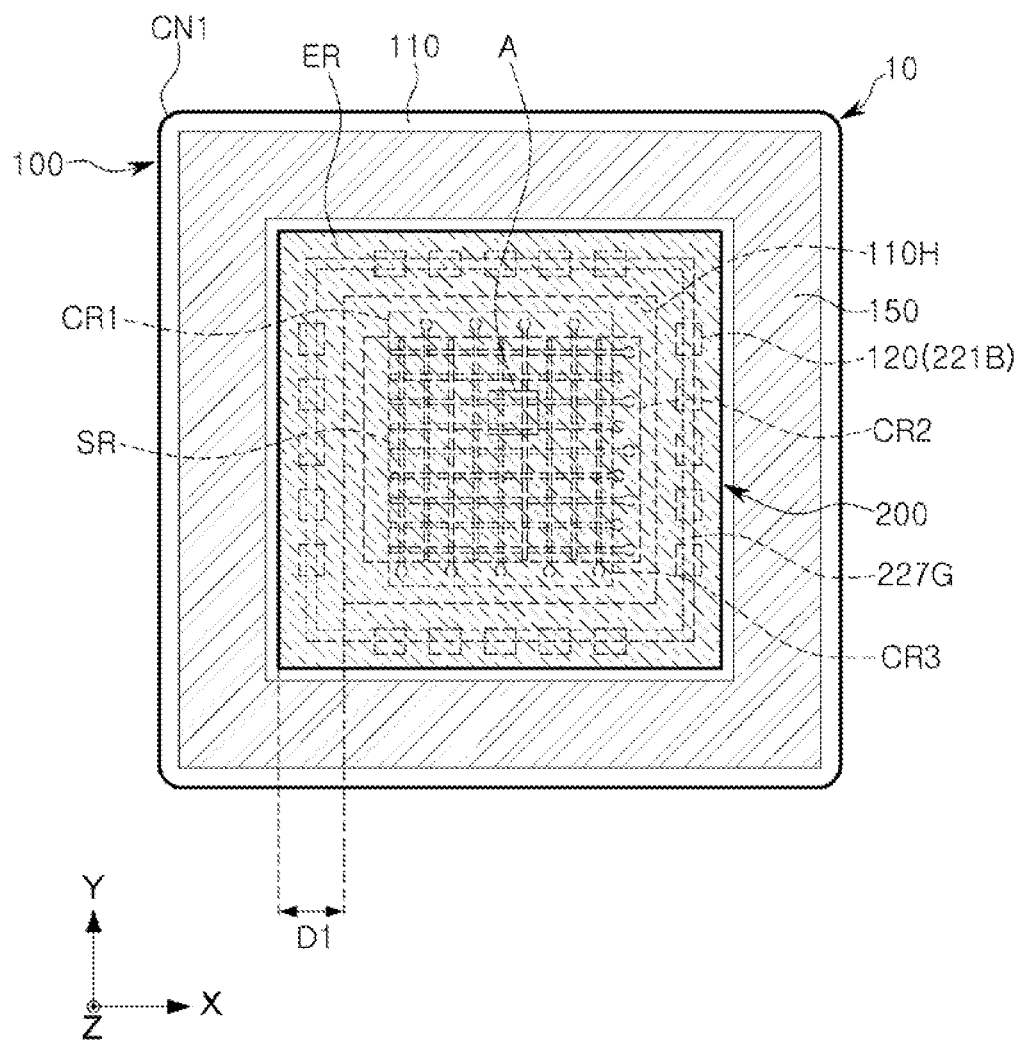
Figure 2C:
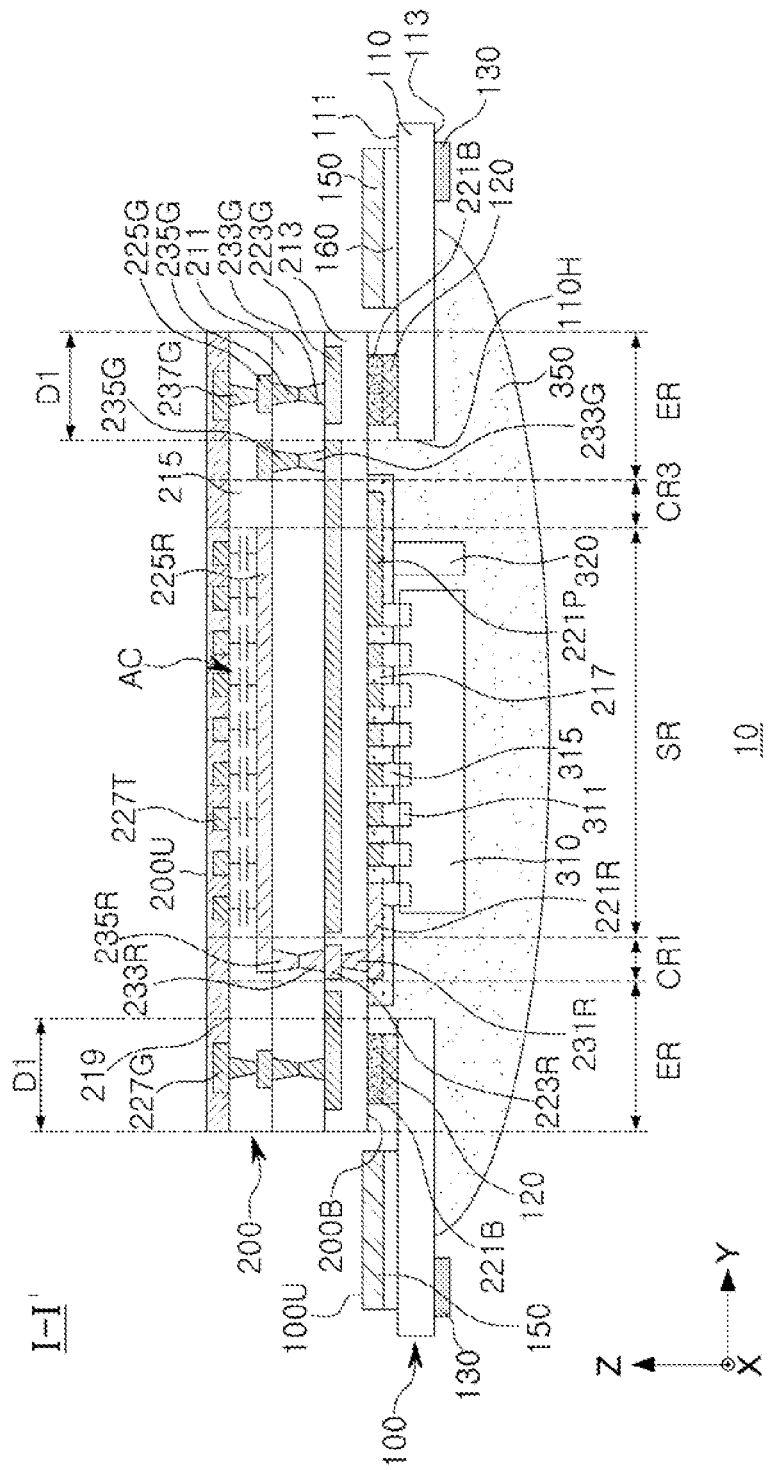
Figure 2D:
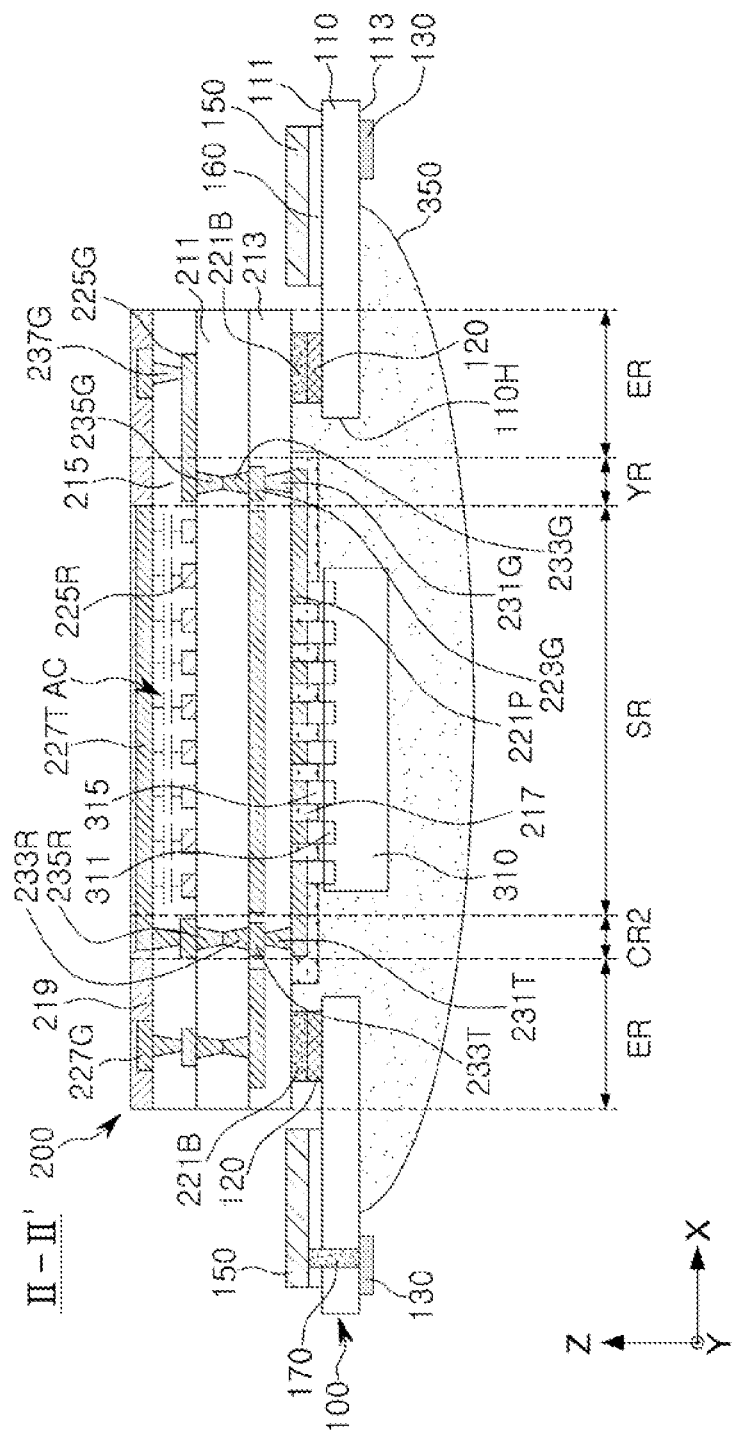
Figure 2E:
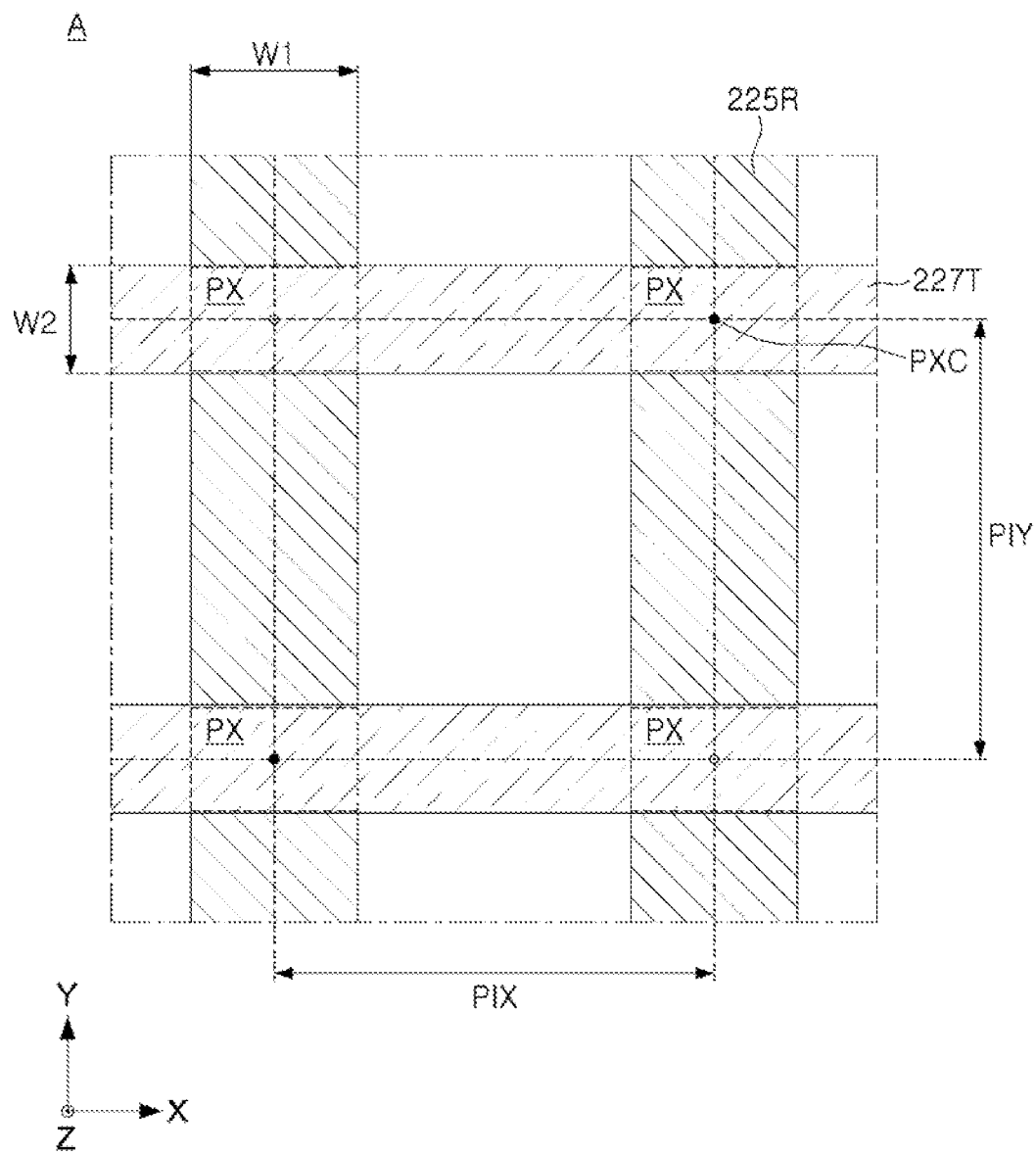

In detail, FIG. 2A is a bottom view schematically illustrating the layout of some components of the fingerprint sensor package 10, FIG. 2B is a plan view illustrating the fingerprint sensor package 10 of FIG. 2A, and FIG. 2C is a cross-sectional view taken along line I-I' of FIG. 2A. FIG. 2D is a cross-sectional view taken along the line II-IF of FIG. 2A, and FIG. 2E is an enlarged view illustrating an enlarged region indicated by "A" in FIG. 2B.

Referring to FIGS. 2A to 2E, the fingerprint sensor package 10 may include a first substrate 100, a second substrate 200, a controller chip 310, a passive element 320, and a molded layer 350.

The total thickness of the fingerprint sensor package 10 according to an example embodiment may be about 0.76 mm or less. In some embodiments, the total thickness of the fingerprint sensor package 10 may be about 0.5 mm or less. For example, the total thickness of the fingerprint sensor package 10 may range from about 0.1 mm to about 0.4 mm. Accordingly, the fingerprint sensor package 10 may be easily applied to various products (e.g., the smart card described above) that are bent or require a thin thickness.

The first substrate 100 may include a core insulating layer 110, first bonding pads 120, external connection pads 130, a ground bezel 150, and an adhesive layer 160. The first substrate 100 may include a printed circuit board (PCB). In example embodiments, the first substrate 100 may include a flexible PCB (FPCB) having flexibility to be bendable. In other example embodiments, the first substrate 100 may include a rigid type PCB.

The core insulating layer 110 may have a substantially rectangular planar shape or a square planar shape, and may be provided in the form of a flexible film or plate. The core insulating layer 110 may include a first surface 111 and a second surface 113 opposing each other. In this case, a direction parallel to a pair of opposing edges of the core insulating layer 110 is defined as a first direction (X-direction), a direction parallel to the other pair of opposing edges is defined as a second direction (Y-direction), and a direction perpendicular to the main surface (the first surface 111 or the second surface 113) of the core insulating layer 110 is defined as a third direction (Z-direction).

The core insulating layer 110 may include an insulating material. For example, the core insulating layer 110 may be a flexible film including polyimide. For example, the core insulating layer 110 may be formed of synthetic resins such as epoxy resin, acrylic, polyether nitrile, polyether sulfone, polyethylene cterephthalate, polyethylene naphthalate, or the like.

A through-hole 110H passing through the first surface 111 and the second surface 113 may be formed in a substantially central portion of the core insulating layer 110. The through-hole 110H may be formed in a size that may accommodate the controller chip 310 and the passive element 320 mounted on the second substrate 200. The through-hole 110H may be formed in a substantially rectangular shape or a square shape.

The first bonding pads 120 may be disposed around the through-hole 110H on the first surface 111 of the core insulating layer 110. For example, the first bonding pads 120 may be arranged along at least some of edges of the through-hole 110H of the core insulating layer 110. The first bonding pads 120 may be formed of a metal layer. For example, the first bonding pads 120 may include gold (Au). The first bonding pads 120 may be formed in positions corresponding to the second bonding pads 221B of the second substrate 200 to be described later and have sizes corresponding to each other. The first bonding pads 120 may be thermocompression bonded to the second bonding pads 221B. Accordingly, the first substrate 100 and the second substrate 200 may be firmly bonded.

The external connection pads 130 may be disposed on the second surface 113 of the core insulating layer 110. The external connection pads 130 may be arranged along the edge of the second surface 113 of the core insulating layer 110. The external connection pads 130 may be disposed to be spaced apart from the molded layer 350. The external connection pad 130 may be a pad electrically and physically connected to an external device (e.g., the card body 500 of FIG. 5F). For example, the external connection pads 130 may include Copper (Cu), aluminum (Al), nickel (Ni), silver (Ag), gold (Au), platinum (Pt), tin (Sn), lead (Pb), titanium (Ti), chromium (Cr), at least one selected from palladium (Pd), indium (In), zinc (Zn), carbon (C), and alloys thereof.

The ground bezel 150 may extend along the circumference of the through-hole 110H. The ground bezel 150 may have a ring shape surrounding the through-hole 110H in a planar manner. The ground bezel 150 may be attached to the first surface 111 of the core insulating layer 110 by an adhesive layer 160. When the through-hole 110H is formed at approximately the center of the first surface 111 of the core insulating layer 110, the ground bezel 150 may be disposed on an outer portion of the first surface 111 of the core insulating layer 110. The ground bezel 150 may be closer to the edge of the first surface 111 of the core insulating layer 110 than the first bonding pad 120. For example, the distance between the edge of the first surface 111 of the core insulation layer 110 and the ground bezel 150 may be smaller than the distance between the edge of the first surface 111 of the core insulation layer 110 and the first bonding pad 120. The ground bezel 150 may be disposed on the edge of the core insulating layer 110 and functions to reduce sensing noise while the user's fingerprint is in contact with the upper surface of the second substrate 200 bonded to the first substrate 100. For example, the ground bezel 150 may include a conductive material, for example, a metal such as copper (Cu) or aluminum (Al). The ground bezel 150 may be electrically grounded. In example embodiments, the ground bezel 150 may be configured to receive a reference potential through the conductive via 170 penetrating through the core insulating layer 110 and the adhesive layer 160 as shown, e.g., in FIG. 2D. The conductive via 170 is configured to electrically connect the ground bezel 150 to the external connection pad 130, and may be used as an electrical path for transferring a reference potential to the ground bezel 150.

In example embodiments, the first substrate 100 may have a shape in which each of the outer corners CN1 is rounded.

In some embodiments, the radius of curvature of the outer edge CN1 of the first substrate 100 may be in a range of about 0.1 mm to about 2 mm. For example, the radius of curvature of the outer edge CN1 of the first substrate 100 may be about 1 mm. The reason why the outer edge CN1 of the first substrate 100 has a rounded shape is to effectively prevent cracks that may occur in the outer edge CN1 during the process of cutting the first panel substrate 100P (refer to FIG. 5E) using a punching facility (PM, see FIG. 5E).

The second substrate 200 may have a substantially rectangular planar shape or a square planar shape. The second substrate 200 may include an upper surface 200U and a lower surface 200B opposing each other. The upper surface 200U of the second substrate 200 is a surface contacted for fingerprint recognition, and the lower surface 200B of the second substrate 200 may be a surface on which components such as the controller chip 310 are mounted. The second substrate 200 may be disposed to cover the through-hole 110H on the first surface 111 of the first substrate 100. The second bonding pads 221B of the second substrate 200 may be bonded to the first bonding pads 120 of the first substrate 100. The first length LX of the second substrate 200 in the first direction (X-direction) may have a range of about 10 mm to about 15 mm. Also, the second length LY in the second direction (Y-direction) of the second substrate 200 may be in a range of about 10 mm to about 15 mm. For example, the first length LX of the second substrate 200 may be about 12.7 mm, and the second length LY may be about 12.7 mm.

Referring to FIG. 2B, the second substrate 200 may include a sensing region SR, first contact region CR1, second contact region CR2, third contact region CR3, wiring region YR (see, e.g., FIG. 2D), and peripheral region ER. The second substrate 200 may be disposed to cover the through-hole 110H of the first substrate 100. The second substrate 200 may have a region overlapping the edge of the first substrate 100 by the first width D1 (e.g., a predetermined width). The first width D1 may range from about 0.1 mm to about 3.0 mm.

Referring to FIG. 2C, the second substrate 200 may include the base layer 211, the lower insulating layer 213 on the lower surface of the base layer 211, the upper insulating layer 215 on the upper surface of the base layer 211, the lower protective layer 217 on the lower surface of the lower insulating layer 213, and the upper protective layer 219 on the upper surface of the upper insulating layer 215.

The second substrate 200 may include a printed circuit board (PCB). In example embodiments, the second substrate 200 may include a rigid type printed circuit board.

In addition, the second substrate 200 may be a multilayered PCB including a plurality of conductive layers. The second substrate 200 may include conductive layers positioned at different vertical levels, and conductive vias for electrically connecting the conductive layers. The conductive layers and conductive vias may include at least one selected from copper (Cu), aluminum (Al), nickel (Ni), silver (Ag), gold (Au), platinum (Pt), tin (Sn), lead (Pb), titanium (Ti), chromium (Cr), palladium (Pd), indium (In), zinc (Zn), carbon (C), and alloys thereof.

For example, the second substrate 200 may include first conductive layers 221B, 221G, 221R, 221T, and 221P, second conductive layers 223G, 223R, 223T, third conductive layers 225G, 225R, 225T, and fourth conductive layers 227G, 227T in the order of distance from the upper surface (200U) beginning with the farthest. The first conductive layers 221B, 221G, 221R, 221T, and 221P are on the lower surface of the lower insulating layer 213, the second conductive layers 223G, 223R, 223T are on the lower surface of the base layer 211, the third conductive layers 225G, 225R, 225T are on the upper surface of the base layer 211, and the fourth conductive layers 227G and 227T may be on the upper surface of the upper insulating layer 215.

The first conductive layers 221B, 221G, 221R, 221T, and 221P may include second bonding pads 221B, 1-1 sensing pads 221R, 1-2 sensing pads 221T, a first ground pattern 221G, and a power pattern 221P. The second conductive layers 223G, 223R, and 223T may include 2-1 sensing pads 223R, 2-2 sensing pads 223T, and a second ground pattern 223G. The third conductive layers 225G, 225R, and 225T may include first sensing patterns 225R, 3-2 sensing pads 225T, and a third ground pattern 225G. The fourth conductive layers 227G and 227T may include second sensing patterns 227T and a fourth ground pattern 227G.

In addition, the second substrate 200 may include first conductive vias 231G, 231R, and 231T for electrically connecting the first conductive layers 221B, 221G, 221R, 221T, and 221P to the second conductive layers 223G, 223R, and 223T; second conductive vias 233G, 233R, and 233T for electrically connecting the second conductive layers 223G, 223R, and 223T to the third conductive layers 225G, 225R, and 225T; and third conductive vias 235G, 235R, and 235T, and fourth conductive vias 237T for electrically connecting the third conductive layers 225G, 225R, and 225T to the fourth conductive layers 227G and 227T. The first conductive vias 231G, 231R, and 231T at least partially penetrate the lower insulating layer 213, the second conductive vias 233G, 233R, 233T partially penetrate the base layer 211, the third conductive vias 235G, 235R, 235T partially penetrate the base layer 211, and the fourth conductive vias 237T and 237G may at least partially penetrate the upper insulating layer 215.

The first conductive vias 231G, 231R, and 231T may include 1-1 sensing vias 231R for electrically connecting the 1-1 sensing pads 221R to the 2-1 sensing pads 223R; 1-2 sensing vias 231T for electrically connecting the 1-2 sensing pads 221T to the 2-2 sensing pads 223T; and a first ground via 231G for electrically connecting the first ground pattern 221G to the second ground pattern 223G. In example embodiments, the first conductive vias 231G, 231R, and 231T may have a tapered structure in which a horizontal width decreases toward the base layer 211.

The second conductive vias 233G, 233R, and 233T may include 2-1 sensing vias 233R for electrically connecting the 2-1 sensing pads 223R to the first sensing patterns 225R; 2-2 sensing vias 233T for electrically connecting the 2-2 sensing pads 223T to the 3-2 sensing pads 225T; and a second ground via 233G for electrically connecting the second ground pattern 223G to the third ground pattern 225G. The third conductive vias 235G, 235R, and 235T may include 3-1 sensing vias 235R for electrically connecting the 2-1 sensing pads 223R to the first sensing patterns 225R; 3-2 sensing vias 235T for electrically connecting the 2-2 sensing pads 223T to the 3-2 sensing pads 225T; and a third ground via 235G for electrically connecting the second ground pattern 223G to the third ground pattern 225G.

The second conductive vias 233G, 233R, and 233T may contact the second conductive layer 223G, 223R, and 223T, the third conductive vias 235G, 235R, and 235T may contact the third conductive layer 225G, 225R, and 225T, and the second conductive vias 233G, 233R, and 233T and the third conductive vias 235G, 235R, and 235T may contact each other. In detail, the 2-1 sensing pads 223R and the first sensing patterns 225R may be electrically connected by the 2-1 sensing vias 233R and the 3-1 sensing vias 235R vertically connected to each other, and the 2-2nd sensing pads 223T and the 3-2nd sensing pads 225T may be electrically connected by the 2-2nd sensing vias 233T and the 3-2nd sensing vias 235T. The second ground pattern 223G and the third ground pattern 223G may be electrically connected by a second ground via 233G and a third ground via 235G that are vertically connected.

In example embodiments, each of the second conductive vias 233G, 233R, 233T and the third conductive vias 235G, 235R and 235T may have a tapered structure in which the horizontal width decreases toward the center of the base layer 211 in the thickness direction. In some embodiments, the second conductive vias 233G, 233R, 233T and the third conductive vias 235G, 235R, 235T may have a minimum horizontal width at the contact surface therebetween (see, e.g., FIGS. 2C and 2D).

The fourth conductive vias 237T and 237G may include 4-2 sensing vias 237T for electrically connecting the 3-2 sensing pads 225T to the second sensing patterns 227T, and a fourth ground via 237G for electrically connecting the third ground pattern 223G to the fourth ground pattern 227G. In example embodiments, the fourth conductive vias 237T and 237G may have a tapered structure in which a horizontal width decreases toward the base layer 211.

Referring to FIG. 2B, the second substrate 200 may include a sensing region SR, first contact region CR1, second contact region CR2, third contact region CR3, wiring region YR, and peripheral region ER. In detail, the sensing region SR may be a region in which the first and second sensing patterns 225R and 227T for fingerprint recognition are disposed. Referring to FIG. 2C, the first contact region CR1 and the third contact region CR3 may be regions in which 1-1 sensing vias 231R, 2-1 sensing vias 233R, and 3-1 sensing vias 235R for connecting the first sensing patterns 225R to the controller chip 310 are disposed. Referring to FIG. 2D, the second contact region CR2 may be a region in which 1-2 sensing vias 231T, 2-2 sensing vias 233T, 3-2 sensing vias 235T, and 4-2 sensing vias 237T for connecting the second sensing patterns 227T to the controller chip 310 are disposed. The wiring region YR may be a region in which at least some of the first to fourth ground vias 231G, 233G, 235G, and 237G for connecting the fourth ground pattern 227G to the controller chip 310 are disposed.

Referring to FIGS. 2B and 2E, the sensing region SR may be disposed in the center of the second substrate 200. In some embodiments, the sensing region SR may have a rectangular or square shape in a plan view. In the sensing region (SR), a plurality of line-shaped first sensing patterns 225R spaced apart in a first direction (X-direction) and extending in a second direction (Y-direction), and a plurality of line-shaped second sensing patterns 227T spaced apart in the second direction (Y-direction) and extending in the first direction (X-direction) may be disposed.

A first contact region CR1 may be formed at one end of the sensing region SR in the second direction (Y-direction), and a third contact region CR3 may be formed at the other end of the sensing region SR in the second direction (Y-direction). In addition, a second contact region CR2 may be formed at one end of the sensing region SR in the first direction (X-direction), a wiring region YR may be formed at the other end of the sensing region SR in the first direction (X-direction).

The peripheral region ER may be disposed at an outer portion of the second substrate 200. The peripheral region ER may surround the sensing region SR in a plan view. Second bonding pads 221B may be disposed in the peripheral region ER. First to fourth ground patterns 221G, 223G, 225G, and 227G for providing a reference potential and shielding sensing noise may be disposed in the peripheral region ER.

The first sensing patterns 225R may extend between the sensing region SR and the first contact region CR1 or between the sensing region SR and the third contact region CR3. The first sensing patterns 225R may be connected to the controller chip 310 through the 1-1 sensing vias 231R, the 2-1 sensing vias 233R, and the 3-1 sensing vias 235R disposed in the first and third contact regions CR1 and CR3. In the first contact region CR1, the 1-1 sensing vias 231R, the 2-1 sensing vias 233R, and the 3-1 sensing vias 235R may be arranged in the first direction (X-direction). In addition, in the third contact region CR3, the 1-1 sensing vias 231R, the 2-1 sensing vias 233R, and the 3-1 sensing vias 235R may be arranged in the first direction (X-direction). Some of the first sensing patterns 225R may be connected to the 1-1 sensing vias 231R, the 2-1 sensing vias 233R, and the third-first sensing vias 235R disposed in the first contact region CR1. In addition, some of the first sensing patterns 225R may be connected to the 1-1 sensing vias 231R, the 2-1 sensing vias 233R, and the 3-1 sensing vias 235R disposed in the third contact region CR3. The adjacent first sensing patterns 225R may be electrically separated from each other.

The second sensing patterns 227T may extend in the sensing region SR and the second contact region CR2. The second sensing patterns 227T may be connected to the controller chip 310 through the 1-2 sensing vias 231T, the 2-2 sensing vias 233T, the 3-2 sensing vias 235T, and the 4-2 sensing via 237T disposed in the second contact region CR2. Each of the 1-2 sensing vias 231T, the 2-2 sensing vias 233T, the 3-2 sensing vias 235T, and the 4-2 sensing vias 237T is in the second direction (Y-direction) and may be staggered in a zigzag manner.

The first sensing patterns 225R may have a first width W1 that is a width in the first direction (X-direction), and the second sensing patterns 227T may have a second width W2 that is a width in the second direction (Y-direction). In some embodiments, the first width W1 may be greater than the second width W2 as shown, e.g., in FIG. 2E. For example, the first width W1 may have a range of about 2 times to about 4 times the second width W2. In detail, the first width W1 may have a range of about 40 µm to about 70 µm, and the second width W2 may have a range of about 5 µm to about 25 µm.

A portion where the first sensing patterns 225R and the second sensing patterns 227T overlap in the third direction (Z-direction) may constitute the pixels PX. The first pitch PIX in the first direction (X-direction) between the centers PXC of the pixels PX may be substantially identical to the second pitch PIY in the second direction (Y-direction) between the centers PXC of the pixels PX, but the disclosure is not limited thereto. For example, each of the first pitch PIX and the second pitch PIY may have a range of about 50 µm to about 90 µm.

The pixels PX may have a composite capacitance value of area capacitance AC by the first sensing patterns 225R and the second sensing patterns 227T overlapping each other, and fringing capacitance by the first sensing patterns 225R and the second sensing patterns 227T.

When the user's fingerprint comes into contact with the upper surface 200U of the second substrate 200, the capacitance value corresponding to each of the pixels PX is changed by the capacitance induced between the second sensing patterns 227T and the user's fingerprint. Since the change in capacitance value is determined by the shape of the user's fingerprint, the controller chip 310 may identify the user's fingerprint from a change in capacitance values of the pixels PX.

The fourth ground pattern 227G may planarly surround the sensing region SR in which the second sensing patterns 227T are disposed. The fourth ground pattern 227G is positioned at the same vertical level as the second sensing patterns 227T, and the second sensing patterns 227T may be surrounded in a planar manner. For example, the fourth ground pattern 227G continuously extends along the edge of the sensing region SR on the upper surface of the upper insulating layer 215, and the second sensing patterns 227T may be surrounded in a planar manner. The fourth ground pattern 227G may be disposed around the sensing region SR to reduce sensing noise while a user's fingerprint is in contact with the sensing region SR.

The base layer 211 may include an insulating material. The base layer 211 may include resin and glass fibers. The resin included in the base layer 211 may be at least one selected from a phenol resin, an epoxy resin, and a polyimide. In some embodiments, the base layer 211 may include at least one selected material from Flame Retardant 4 (FR4), Tetrafunctional epoxy, Polyphenylene ether, Epoxy/polyphenylene oxide, Thermount, Bismaleimide triazine (BT), Cyanate Among ester (Cyanate ester), polyimide, prepreg, Ajinomoto Build-up Film (ABF), and liquid crystal polymer. In other embodiments, the base layer 211 may include silicon oxide, silicon nitride, silicon oxynitride, or a combination thereof. The glass fiber included in the base layer 211 is a reinforcing material, and a glass filament obtained by melt-spinning a glass material at a high temperature may be subjected to a focusing treatment. The glass filament may be an ore processing product containing silica as a main component.

Hereinafter, for convenience of explanation and understanding, the components of the second substrate 200 will be described in an order close to the base layer 211.

The second conductive layers 223G, 223R, and 223T may include 2-1 sensing pads 223R, 2-2 sensing pads 223T, and a second ground pattern 223G to which a reference potential is applied. The second ground pattern 223G may be disposed in the sensing region SR, the wiring region YR, and the peripheral region ER. A portion of the second ground pattern 223G may overlap the first sensing patterns 225R and the second sensing patterns 227T in the third direction (Z-direction). A portion of the second ground pattern 223G may be interposed between the second sensing patterns 227T and the controller chip 310. Accordingly, the second ground pattern 223G may block external sensing noise from the controller chip 310. The 2-1 sensing pads 223R may be disposed in the first and third contact regions CR1 and CR3, and the 2-2nd sensing pads 223T may be disposed in the second contact region CR2. The 2-1 sensing pads 223R may provide a path for electrical connection between the first sensing patterns 225R and the controller chip 310, and the 2-2nd sensing pads 223T may provide a path for electrical connection between the second sensing patterns 227T and the controller chip 310.

The lower insulating layer 213 may be disposed on the lower surface of the base layer 211 to cover the second conductive layers 223G, 223R, and 223T. The lower insulating layer 213 may electrically isolate the 2-1 sensing pads 223R, the 2-2 sensing pads 223T, and the second ground pattern 223G from each other.

The third conductive layer (225G, 225R, 225T) may include a third ground pattern 225G to which a reference potential is applied, first sensing patterns 225R for recognizing a user's fingerprint, and 3-2 sensing pads 225T. The first sensing patterns 225R may be disposed in the sensing region SR, the third ground pattern 225G may be disposed in the wiring region YR and the peripheral region ER, and the 3-2 sensing pads 225T may be disposed in the second contact region CR2. The 3-2nd sensing pads 225T may provide a path for electrical connection between the second sensing patterns 227T and the controller chip 310.

The upper insulating layer 215 may be disposed on the upper surface of the base layer 211 to cover the third conductive layers 225G, 225R, and 225T. The upper insulating layer 215 may electrically isolate the first sensing patterns 225R, the 3-2 sensing pads 225T, and the third ground pattern 223G from each other.

The lower insulating layer 213 and the upper insulating layer 215 may include different materials. For example, the upper insulating layer 215 may include a material having a dielectric constant suitable for fingerprint recognition of the fingerprint sensor package 10. However, the disclosure is not limited thereto, and the lower insulating layer 213 and the upper insulating layer 215 may include the same material.

Each of the lower insulating layer 213 and the upper insulating layer 215 may include at least one selected from a phenol resin, an epoxy resin, and a polyimide. In some embodiments, each of the lower insulating layer 213 and the upper insulating layer 215 may include at least any one selected from Prepreg, FR4, quadrilateral epoxy, polyphenylene ether, epoxy/polyphenylene oxide, thermount, BT, cyanate ester, polyimide, and liquid crystal polymer.

The fourth conductive layers 227G and 227T may be disposed on the upper surface of the upper insulating layer 215. The fourth conductive layers 227G and 227T may include a fourth ground pattern 227G for removing sensing noise and second sensing patterns 227T for recognizing a user's fingerprint. The second sensing patterns 227T may be disposed in the sensing region SR, and the fourth ground pattern 227G may be disposed in the peripheral region ER.

The second sensing patterns 227T may be spaced apart from the first sensing patterns 225R in the third direction (Z-direction) with the insulating layer 215 interposed therebetween. For example, the second sensing patterns 227T may be electrically insulated from the first sensing patterns 225R by the upper insulating layer 215. Accordingly, the first sensing patterns 225R constitute the first electrode of the capacitor, the upper insulating layer 215 constitutes the dielectric layer of the capacitor, and the second sensing patterns 227T may constitute a second electrode of the capacitor. For example, capacitors constituting the fingerprint sensor may be formed in the second substrate 200.

The upper protective layer 219 may be disposed on the upper surface of the upper insulating layer 215 to cover the fourth conductive layers 227G and 227T.

The first conductive layers 221B, 221G, 221R, 221T, and 221P may be disposed on the lower surface of the lower insulating layer 213. The first conductive layers 221B, 221G, 221R, 221T, and 221P may include the second bonding pads 221B, the 1-1 sensing pads 221R, the 1-2 sensing pads 221T, and the first ground pattern 221G to which the reference potential is applied.

The second bonding pads 221B may be directly bonded to and electrically connected to the first bonding pads 120 of the first substrate 100. For example, the second bonding pads 221B may include at least one selected from tin (Sn), gold (Au), and alloys thereof. The second bonding pads 221B may be formed at positions corresponding to the first bonding pads 120 and have sizes corresponding to each other. The second bonding pads 221B may include a power pad to which power (e.g., power potential) provided from an external device is applied, a ground pad to which a reference potential is applied, and an output pad for outputting the fingerprint recognition result of the fingerprint sensor package 10 to the outside (e.g., the display unit 12 of the smart card 1 of FIG. 1). The controller chip 310 receives the power potential through some of the second bonding pads 221B and the power pattern 221P, and a reference potential may be transmitted through some of the second bonding pads 221B and the first ground pattern 221G. In addition, the controller chip 310 may receive signals recognized by the first and second sensing patterns 225R and 227T through the 1-1 sensing pads 221R and the 1-2 sensing pads 221T.

The 1-1 sensing pads 221R may extend from the first and third contact regions CR1 and CR3 to a portion overlapping the controller chip 310 in the third direction (Z-direction), and the 1-2 sensing pads 221T may extend from the second contact region CR2 to a portion overlapping the controller chip 310 in the third direction (Z-direction). The 1-1 sensing pads 221R may provide a path for electrical connection between the first sensing patterns 225R and the controller chip 310, and the 1-2 sensing pads 221T may provide a path for electrical connection between the second sensing patterns 227T and the controller chip 310.

The lower protective layer 217 may be disposed on the lower surface of the lower insulating layer 213 to cover at least a portion of the first conductive layers 221B, 221G, 221R, 221T, and 221P. In some example embodiments, the lower protective layer 217 may be formed to cover a portion of a lower surface of the lower insulating layer 213. In other example embodiments, the lower protective layer 217 may be formed to entirely cover the lower surface of the lower insulating layer 213.

Each of the lower protective layer 217 and the upper protective layer 219 may be an insulating coating layer. In some embodiments, the lower protective layer 217 and the upper protective layer 219 may be formed of a solder resist. In other embodiments, the lower protective layer 217 and the upper protective layer 219 may include a polymer material having excellent heat resistance, insulation, and hardness. For example, each of the lower protective layer 217 and the upper protective layer 219 may be made of polyimide, polyamide, polyacetal, polycarbonate, or the like. In some embodiments, the upper protective layer 219 may include a material having a dielectric constant suitable for recognizing a fingerprint (e.g., a high dielectric material).

The controller chip 310 and the passive element 320 may be disposed on the lower surface 200B of the second substrate 200. The controller chip 310 may be mounted on the lower surface 200B of the second substrate 200 in a flip-chip manner. Connection bumps 315 for electrically and physically connecting the controller chip 310 to the second substrate 200 may be disposed between the controller chip 310 and the second substrate 200. The connection bumps 315 may be disposed between some patterns of the first conductive layers 221B, 221G, 221R, 221T, and 221P and the chip pads 311 of the controller chip 310.

In some embodiments, the controller chip 310 may be entirely or partially disposed within the sensing region SR. In other embodiments, the controller chip 310 may be entirely disposed outside the sensing region SR. The controller chip 310 may include any configuration required to perform an operation for recognizing a user's fingerprint from a change in capacitance values of the pixels PX, such as a memory chip and/or a processor chip. In addition, the passive element 320 may include, for example, a multilayer ceramic capacitor (MLCC), but is not limited thereto.

The molded layer 350 may be disposed on the second surface 100B of the first substrate 100 to cover the through-hole 110H. Also, the molded layer 350 may be disposed to fill the through-hole 110H to cover the controller chip 310 and the passive element 320. The molded layer 350 may serve to protect the second substrate 200, the controller chip 310, and the passive element 320 from external influences such as contamination and impact. In addition, the molded layer 350 covers the second surface 113 of the core insulating layer 110 that is the lower surface 100B of the first substrate 100. The external connection pads 130 may not be covered and may instead be exposed to the outside. The molded layer 350 may be formed of an epoxy molding compound. Alternatively, the molded layer 350 may be formed of an epoxy-based material, a thermosetting material, a thermoplastic material, a UV-treated material, or the like.

In the fingerprint sensor package 10 of an example embodiment, since the first bonding pads 120 of the first substrate 100 are directly bonded to the second bonding pads 221B of the second substrate 200 by thermocompression bonding, compared to the case of electrically connecting the first bonding pads 120 and the second bonding pads 221B using a conductive wire, even if mechanical stress is repeatedly applied to the second substrate 200, the electrical connection between the first substrate 100 and the second substrate 200 may not be damaged. Accordingly, the reliability of the fingerprint sensor package 10 may be improved. In addition, since the first substrate 100 and the second substrate 200 are thermocompression-bonded, the first substrate 100 and the second substrate 200 may be firmly bonded.

Figure 3:
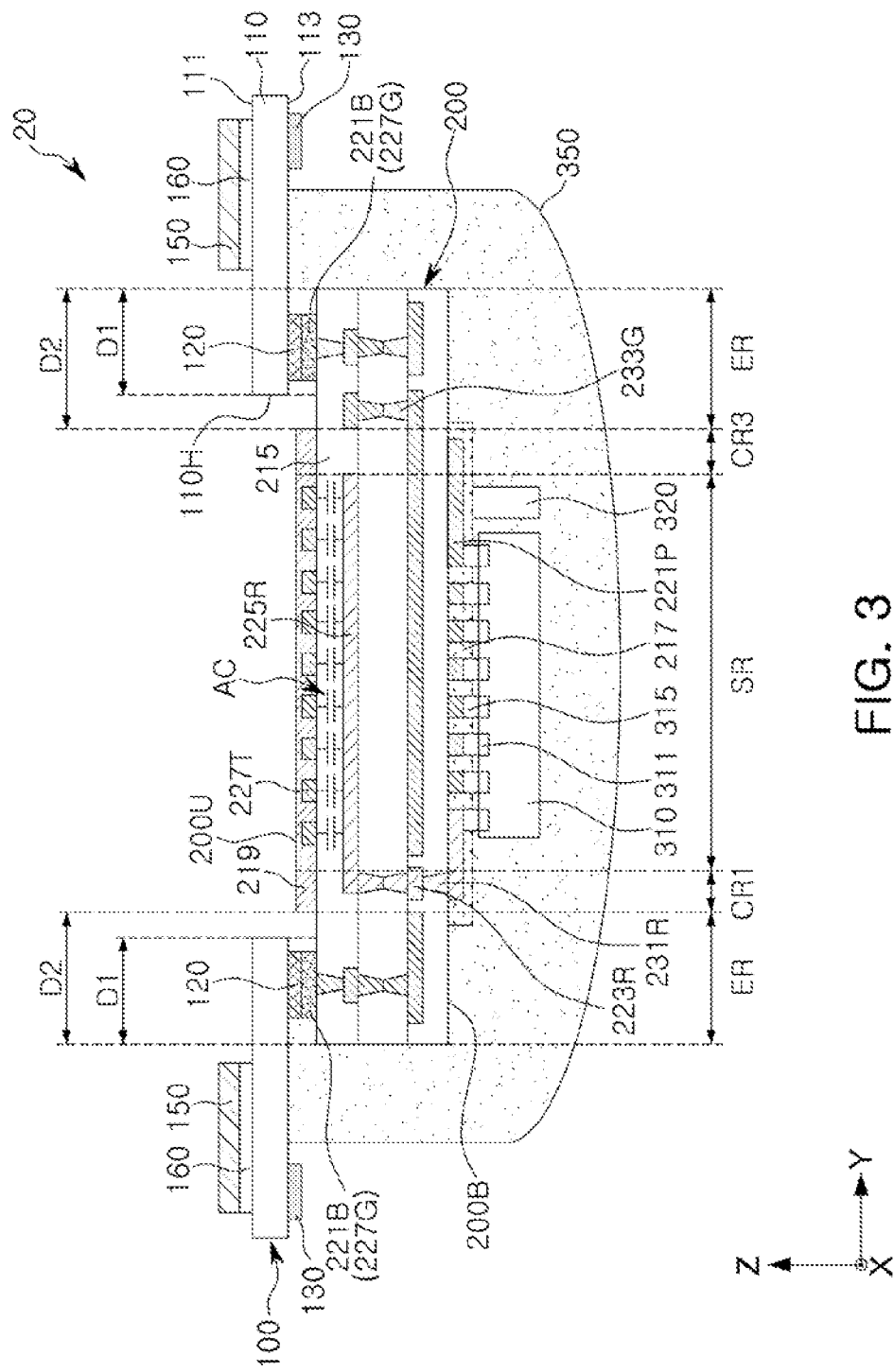
FIG. 3 is a plan view illustrating a fingerprint sensor package according to an example embodiment.

FIG. 3 is a cross-sectional view illustrating a fingerprint sensor package 20 according to example embodiments.

The fingerprint sensor package 20 illustrated in FIG. 3 may be substantially the same as or similar to the fingerprint sensor package 10 described with reference to FIGS. 2A-2E, except that the second substrate 200 is bonded on the lower surface 100B of the first substrate 100 and a part of the upper protective layer 219 of the second substrate 200 is removed. Hereinafter, the fingerprint sensor package 20 of FIG. 3 will be described with a focus on differences from the fingerprint sensor package 10 described with reference to FIGS. 2A to 2E.

Referring to FIG. 3, the upper protective layer 219 of the second substrate 200 covers the upper surface 200U of the second substrate 200 and is spaced apart from the edges of the upper surface 200U of the second substrate 200. Accordingly, the upper insulating layer 215 may be exposed at the edge of the upper surface 200U of the second substrate 200. Also, the upper protective layer 219 may be spaced apart from the side surface of the second substrate 200 by a second width D2. The upper surface 200U of the second substrate 200 may be disposed at a lower level than the first surface 111 of the core insulating layer 110. The second width D2 may be greater than the first width D1. In a region of the upper surface 200U of the second substrate 200 from which the upper protective layer 219 has been removed, second bonding pads 221B bonded to the first bonding pads 120 of the first substrate 100 may be disposed. The second bonding pads 221B may be a part of the fourth ground pattern 227G.

The molded layer 350 may cover the lower surface 200B and side surfaces of the second substrate 200, and may be formed to extend on the lower surface 200B of the first substrate 200.

Figure 4A:
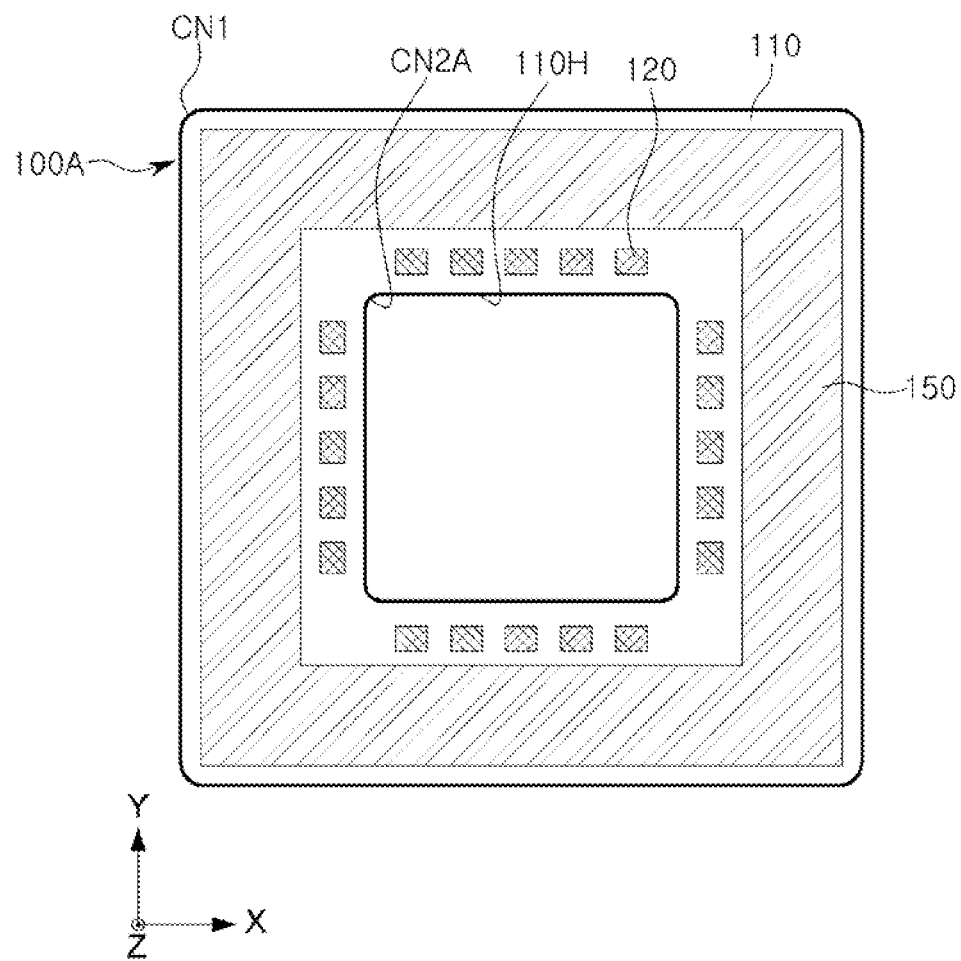
FIGS. 4A and 4B are plan views illustrating a modified example of a first substrate employable in a fingerprint sensor package according to an example embodiment.
Figure 4B:
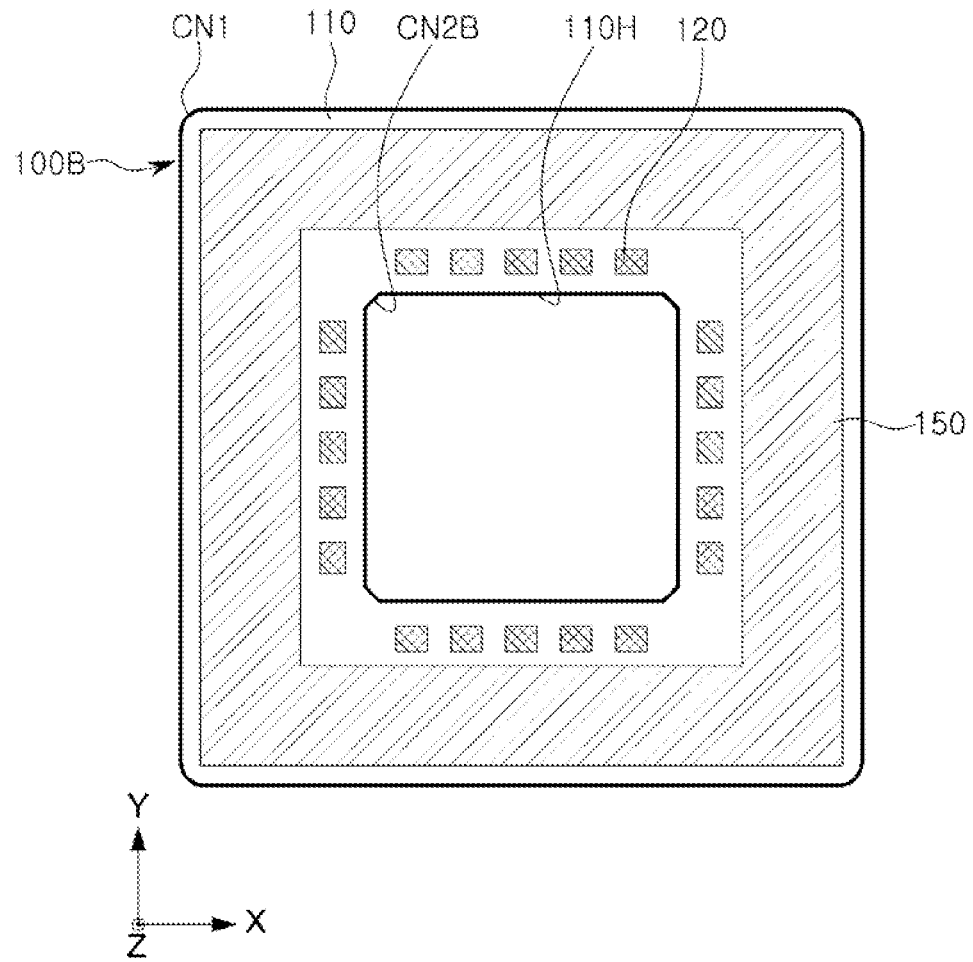

FIGS. 4A and 4B are plan views illustrating various modifications of a first substrate employable in a fingerprint sensor package according to example embodiments, respectively.

Referring to FIG. 4A, all of the inner corners CN2A formed in the through-hole 110H of the first substrate 100A may be formed in a rounded shape. In some embodiments, the inner corner CN2 of the first substrate 100A may have substantially the same radius of curvature as the outer corner CN1. Referring to FIG. 4B, all of the inner corners CN2B formed in the through-hole 110H of the first substrate 100B may be formed in a tapered shape.

Figure 5A:
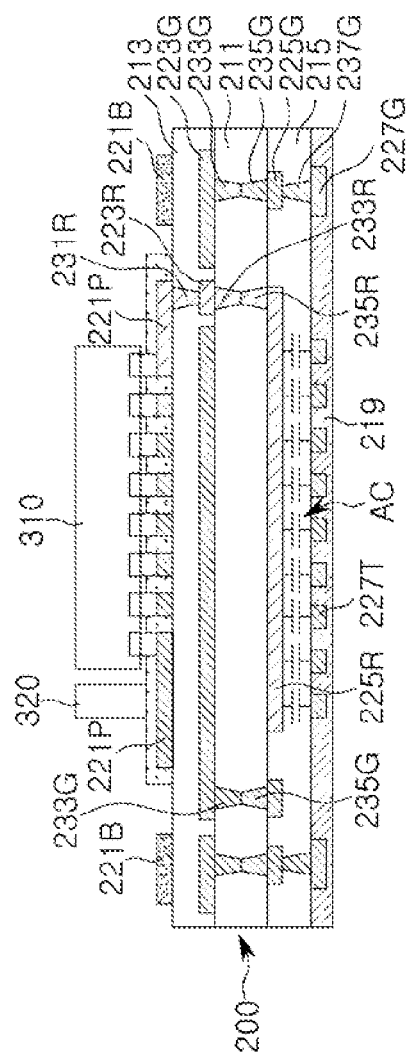
FIGS. 5A to 5G are diagrams illustrating a method of manufacturing a smart card according to an example embodiment according to a process sequence.
Figure 5B:
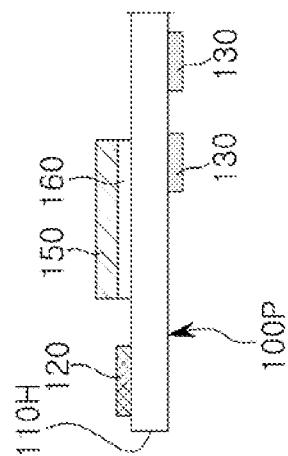
Figure 5B:
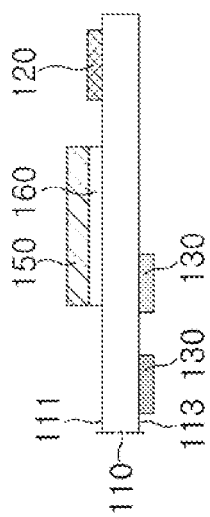
Figure 5C:
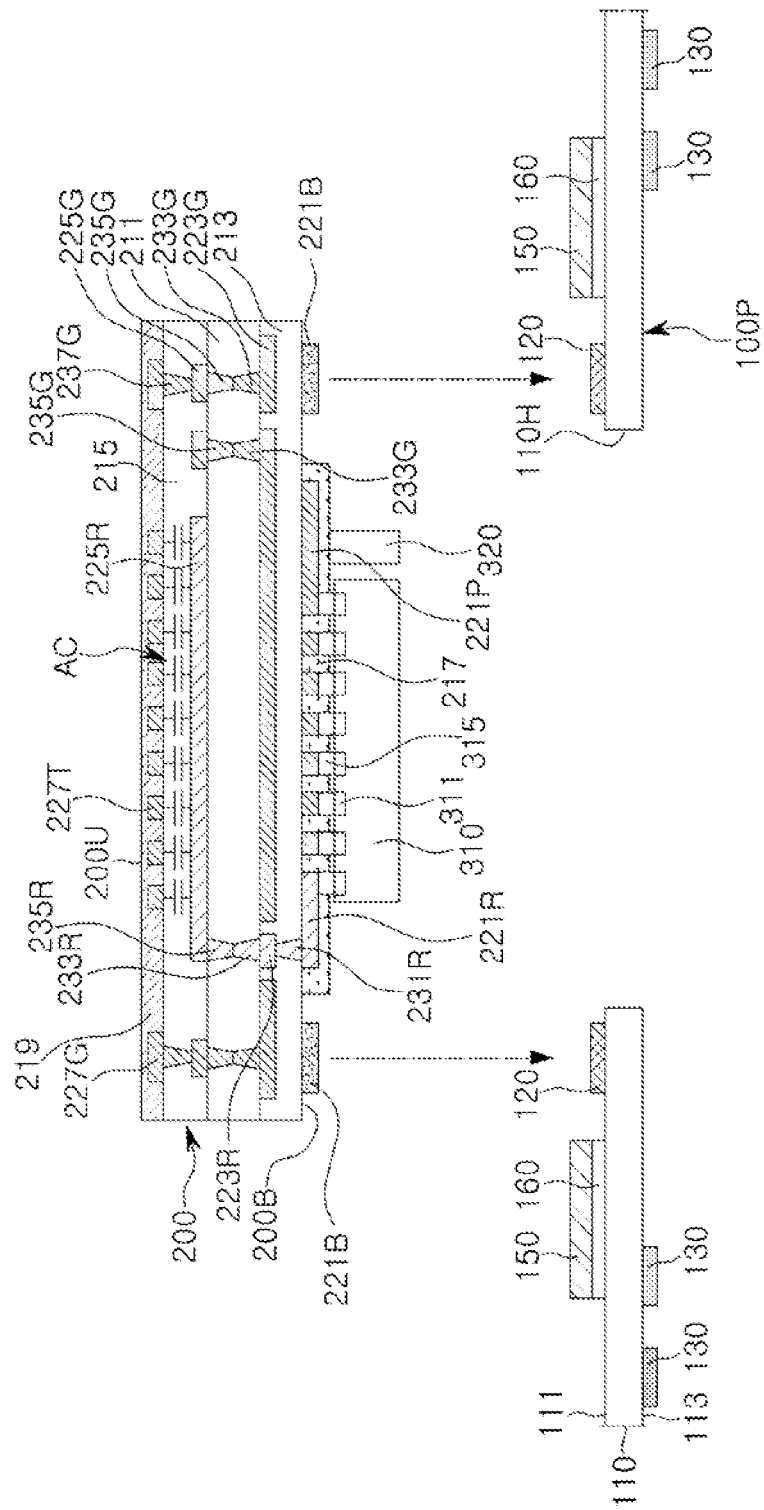
Figure 5D:
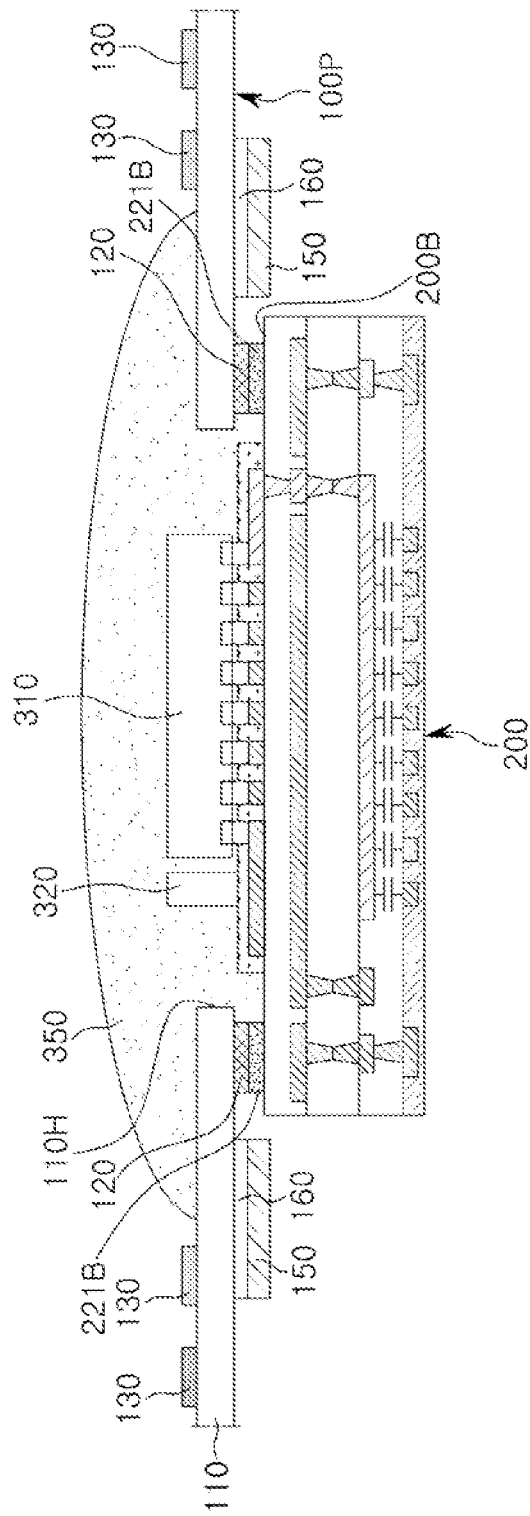
Figure 5E:
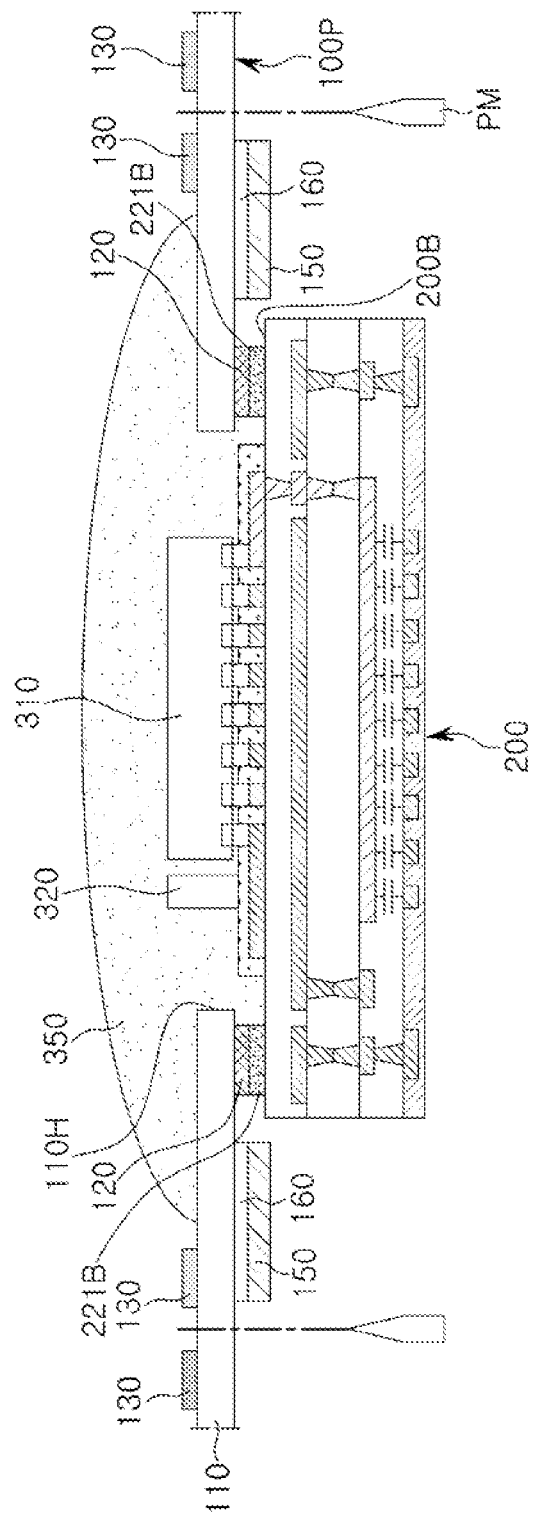
Figure 5F:
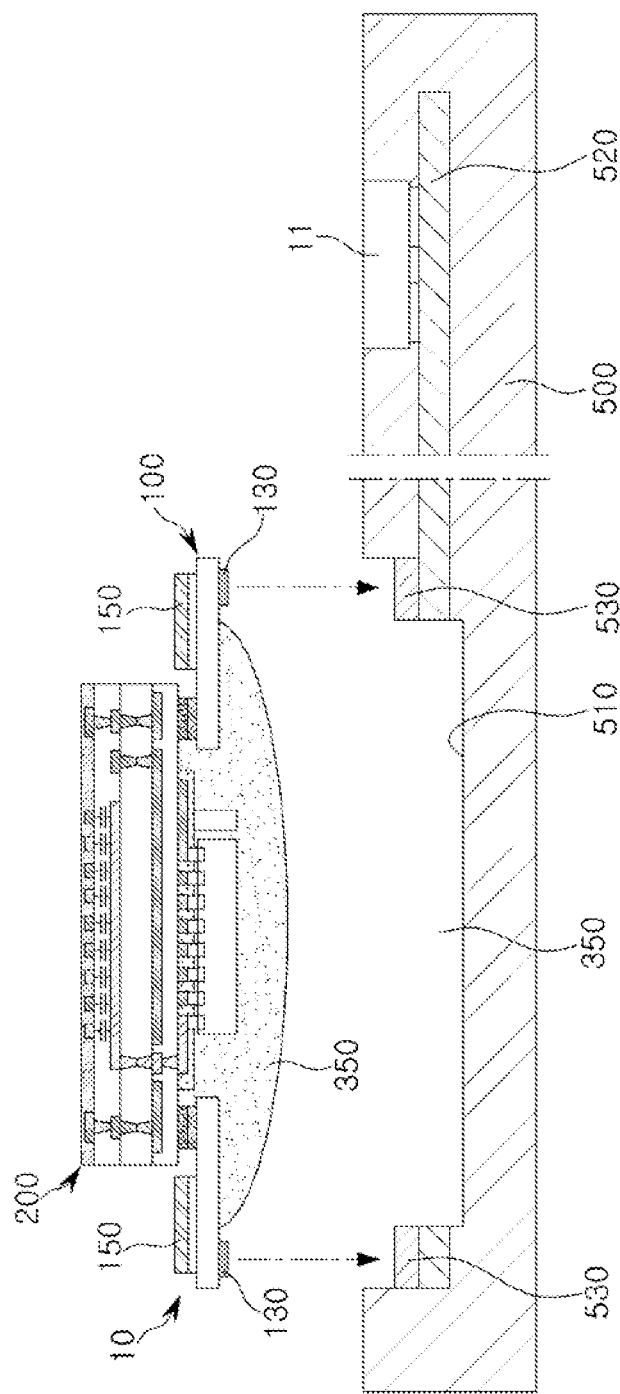
Figure 5G:
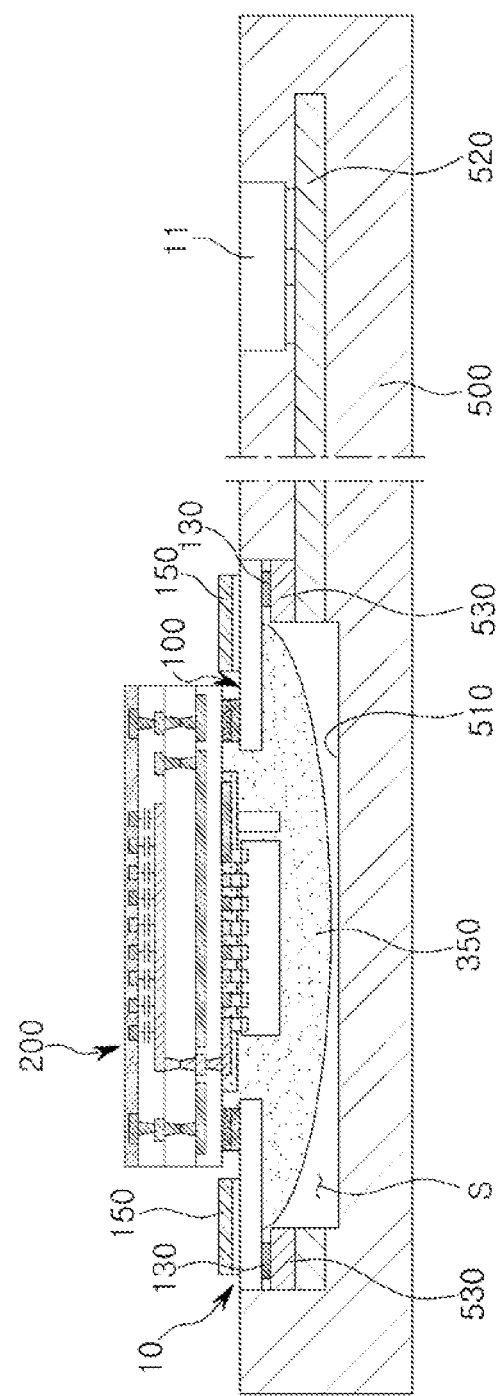

FIGS. 5A to 5G are diagrams sequentially illustrating a method of manufacturing a smart card according to example embodiments. In detail, FIGS. 5A to 5E are a process for manufacturing a fingerprint sensor package mounted on a smart card, and FIGS. 5F and 5G show a process for manufacturing a smart card by mounting a fingerprint sensor package on a card body.

Referring to FIG. 5A, the second substrate 200 is prepared, and the controller chip 310 and the passive element 320 are mounted on the second substrate 200. The controller chip 310 may be mounted on the second substrate 200 by a flip chip method.

Referring to FIG. 5B, a first panel substrate 100P on which the second substrate 200 will be mounted is prepared. Most of the components and materials constituting the first panel substrate 100P are substantially the same as or similar to those of the first substrate 100 of the fingerprint sensor package 10 described with reference to FIGS. 2A to 2E. However, the first panel substrate 100P may have a larger plan region than the first substrate 100 such that a plurality of the second substrates 200 may be mounted thereon. The first panel substrate 100P may be mounted on a winding reel facility, and reeling and releasing of the first panel substrate 100P may be controlled by the winding reel facility. The second substrate 200 may be provided in a state in which the through-hole 110H is formed.

Referring to FIG. 5C, the second substrate 200 is bonded to the first panel substrate 100P. The second bonding pads 221B of the second substrate 200 may be thermocompression-bonded to the first bonding pads 120 of the first panel substrate 100P, respectively. Accordingly, the second substrate 100 may be firmly bonded to the first panel substrate 100P. The controller chip 310 and the passive element 320 mounted on the lower surface 200B of the second substrate 200 may be accommodated in the through-hole 110H of the first panel substrate 100P.

Referring to FIG. 5D, a molded layer 350 is formed on the second surface 113 of the core insulating layer 110. The molded layer 350 may cover the first panel substrate 100P, the controller chip 310, and the passive element 320. The molded layer 350 may flow into the through-hole 110H of the first panel substrate 100P and cover the side surface of the through-hole 110H and the upper surface of the second substrate 200. Also, the molded layer 350 may be formed so as not to cover the external connection pad 130 of the first panel substrate 100P.

Referring to FIG. 5E, the first panel substrate 100P may be cut using the punching facility PM. The punching facility PM may cut the first panel substrate 100P such that the fingerprint sensor package 10 described with reference to FIGS. 2A to 2E is formed. As the first panel substrate 100P is cut, a plurality of first substrates (100 in FIG. 2C) may be formed from the first panel substrate 100P. In order to efficiently prevent cracks that may occur in the process of cutting the first panel substrate 100P by using the punching facility PM, the punching facility PM is configured to form a shape in which the corners of the first substrate 100 are rounded. The first panel substrate 100P may be cut to have the same.

Referring to FIG. 5F, a card body 500 including a card board 520, a connection pad 530, and a security chip 11 is prepared.

The card body 500 may include a groove region 510 for mounting the fingerprint sensor package 10. A card board 520 and a security chip 11 for storing financial information may be disposed on the card body 500. For example, the card board 520 may be an FPCB. The security chip 11 may be mounted on the card board 520. The security chip 11 may be disposed in the card body 500 such that one surface thereof is exposed to the outside. In addition, a connection pad 530 for electrical connection between the fingerprint sensor package 10 and other components in the card body 500 may be disposed on the card board 520. The connection pad 530 may include a conductive material. The fingerprint sensor package 10 is aligned with the groove region 510 of the card body 500 such that the upper surface 200U of the second substrate 200 may be exposed to the outside.

Referring to FIG. 5G, the fingerprint sensor package 10 is mounted on the card body 500. A part of the fingerprint sensor package 10 may be accommodated in the groove region 510 of the card body 500. The molded layer 350 of the fingerprint sensor package 10 may be accommodated in the groove region 510, and the external connection pad 130 of the first substrate 100 may be bonded to the connection pad 530 of the card substrate 520. The external connection pad 130 of the first substrate 100 may be physically and electrically connected to the connection pad 530 of the card substrate 520. In some embodiments, the groove region 510 is not completely filled by the molded layer 350 of the fingerprint sensor package 10, and a flow space S may be formed between the molded layer 350 of the fingerprint sensor package 10 and the card body 500. The flow space S may provide a space in which the fingerprint sensor package 10 may flexibly respond according to the degree of bending of the smart card 1. In other embodiments, the flow space S may be filled by applying an adhesive.

Referring again to FIG. 1, the smart card 1 may include a fingerprint sensor package 10, a security chip 11, a display unit 12, and a power button 13. When a user brings a fingerprint into contact with the fingerprint sensor package 10 of the smart card 1, the touched fingerprint may be recognized. When the recognized fingerprint and a registered fingerprint match, the security chip 11 may grant a payment right to the user of the smart card 1.

As set forth above, the fingerprint sensor package according to an example embodiment may provide performance that is not damaged even after repeated use by improving reliability.

While example embodiments have been illustrated and described above, it will be apparent to those skilled in the art that modifications and variations could be made without departing from the scope of the disclosure as defined by the appended claims.

What is claimed is:

1. A fingerprint sensor package comprising:
   a first substrate comprising:
      a core insulating layer having a first surface and a second surface opposing each other, the first substrate having a through-hole penetrating through the first surface and the second surface,
      a first bonding pad along a circumference of the through-hole on the first surface, and
      an external connection pad on an edge of the second surface;
   a second substrate comprising:
      a third surface and a fourth surface opposing each other,
      a plurality of first sensing patterns spaced apart from each other in a first direction and extending in a second direction intersecting the first direction,
      a plurality of second sensing patterns spaced apart from each other in the second direction and extending in the first direction, on the third surface, and
      a second bonding pad on an edge of the fourth surface and bonded to the first bonding pad, the second substrate having an overlapping region covering the through-hole and overlapping the edge of the second surface;
   a controller chip on the fourth surface of the second substrate and accommodated in the through-hole of the first substrate; and
   a molded layer filling the through-hole on the second surface of the core insulating layer, covering the controller chip, and spaced apart from the external connection pad.

2. The fingerprint sensor package of claim 1, wherein the first bonding pad is thermocompression bonded to the second bonding pad.

3. The fingerprint sensor package of claim 2, wherein the first bonding pad comprises gold (Au), and
   wherein the second bonding pad comprises gold (Au) or tin (Sn).

4. The fingerprint sensor package of claim 1, wherein the first bonding pad comprises a same material as a material of the second bonding pad, and
   wherein the same material comprises gold (Au).

5. The fingerprint sensor package of claim 1, wherein the overlapping region is has a predetermined width from a side surface of the through-hole of the first substrate, and
   wherein the predetermined width is in a range from 0.1 mm to 3.0 mm.

6. The fingerprint sensor package of claim 1, wherein the first substrate further includes a ground bezel extending along the circumference of the through-hole, on the first surface of the core insulating layer, and
   wherein the ground bezel is spaced apart from the through-hole by a greater distance than a distance from the first bonding pad to the through-hole.

7. The fingerprint sensor package of claim 1, wherein the second substrate further comprises:
   a base layer;
   a lower insulating layer on a lower surface of the base layer; and
   an upper insulating layer on an upper surface of the base layer,
   wherein the plurality of first sensing patterns are on the upper surface of the base layer,
   wherein the plurality of second sensing patterns are on an upper surface of the upper insulating layer, and
   wherein the second bonding pad and the controller chip are on a lower surface of the lower insulating layer.

8. The fingerprint sensor package of claim 7, further comprising:
   an upper protective layer covering the upper surface of the upper insulating layer; and
   a lower protective layer covering the lower surface of the lower insulating layer.

9. The fingerprint sensor package of claim 1, wherein the core insulating layer comprises a flexible film.

10. A fingerprint sensor package comprising:
a first substrate comprising:
- a core insulating layer having a first surface and a second surface opposing each other, the first substrate having a through-hole penetrating through the first surface and the second surface,
- a first bonding pad along a circumference of the through-hole on one of the first surface and the second surface, and
- an external connection pad on an edge of the second surface;

a second substrate having a third surface in which a sensing region and a peripheral region surrounding the sensing region are partitioned, and a fourth surface opposing the third surface, the second substrate comprising a second bonding pad along an edge of one of the third surface and the fourth surface and bonded to the first bonding pad, the second substrate covering the through-hole;

a controller chip on the fourth surface; and a molded layer on the second surface of the core insulating layer, covering the controller chip, and spaced apart from the external connection pad.

11. The fingerprint sensor package of claim 10, wherein the sensing region comprises:
a plurality of first sensing patterns spaced apart from each other in a first direction and extending in a second direction, intersecting the first direction; and
a plurality of second sensing patterns spaced apart from each other in the second direction and extending in the first direction.

12. The fingerprint sensor package of claim 11, wherein the plurality of first sensing patterns and the plurality of second sensing patterns are spaced apart from each other in a third direction, perpendicular to the first direction and the second direction, and
wherein the plurality of first sensing patterns and the plurality of second sensing patterns together constitute a plurality of capacitors.

13. The fingerprint sensor package of claim 11, wherein the first bonding pad is on the first surface of the first substrate, and
wherein the second bonding pad is on the fourth surface of the second substrate.

14. The fingerprint sensor package of claim 11, wherein the first bonding pad is on the second surface of the first substrate, and
wherein the second bonding pad is on the third surface of the second substrate.

15. The fingerprint sensor package of claim 14, wherein the second substrate further comprises:
a base layer;
a lower insulating layer on a lower surface of the base layer; and
an upper insulating layer on an upper surface of the base layer,
wherein the plurality of first sensing patterns are on the upper surface of the base layer,
wherein the plurality of second sensing patterns are on an upper surface of the upper insulating layer,
wherein the second bonding pad is on the upper surface of the upper insulating layer, and
wherein the controller chip is on a lower surface of the lower insulating layer.

16. The fingerprint sensor package of claim 15, further comprising:
an upper protective layer covering the upper surface of the upper insulating layer and spaced apart from the second bonding pad; and
a lower protective layer covering the lower surface of the lower insulating layer.

17. The fingerprint sensor package of claim 14, wherein the molded layer covers a side surface of the second substrate.

18. A smart card comprising:
a card body comprising a groove region and a connection pad;
a security chip in the card body; and
a fingerprint sensor package configured to sense a user's fingerprint and transmit a signal comprising a sensing result to the security chip,
wherein the fingerprint sensor package comprises:
a first substrate comprising:
- a core insulating layer having a first surface and a second surface opposing each other, the first substrate having a through-hole penetrating through the first surface and the second surface,
- a first bonding pad along a circumference of the through-hole on one of the first surface and the second surface, and
- an external connection pad on an edge of the second surface;

a second substrate having a third surface in which a sensing region and a peripheral region surrounding the sensing region are partitioned and a fourth surface opposing the third surface, the second substrate comprising a second bonding pad along an edge of one of the third surface and the fourth surface and bonded to the first bonding pad, the second substrate covering the through-hole;

a controller chip on the fourth surface; and a molded layer on the second surface of the core insulating layer, covering the controller chip, and spaced apart from the external connection pad, and wherein the external connection pad of the first substrate is bonded to the connection pad of the card body.

19. The smart card of claim 18, wherein the first bonding pad is thermocompression bonded to the second bonding pad, and
wherein the external connection pad is thermocompression bonded with the connection pad.

20. The smart card of claim 18, wherein the first substrate comprises a flexible printed circuit board (FPCB), and
wherein the second substrate comprises a rigid type printed circuit board (PCB).

* * * * *